United States Patent [19]
Topka et al.

[11] Patent Number: 5,398,334
[45] Date of Patent: Mar. 14, 1995

[54] SYSTEM FOR AUTOMATIC GARBAGE COLLECTION USING STRONG AND WEAK ENCAPSULATED POINTERS

[75] Inventors: Terry M. Topka, Scotia; Paul C. Brown, Schenectady, both of N.Y.

[73] Assignee: General Electric Company, Schenectady, N.Y.

[21] Appl. No.: 863,924

[22] Filed: Apr. 6, 1992

[51] Int. Cl.$^6$ .............................................. G06F 15/40
[52] U.S. Cl. ........................... 395/600; 364/DIG. 1; 364/245.5; 364/282.1; 395/425
[58] Field of Search .................... 395/600, 425

[56] References Cited

U.S. PATENT DOCUMENTS

| | | | |
|---|---|---|---|
| 4,695,949 | 9/1987 | Thatte et al. | 395/600 |
| 4,755,939 | 7/1988 | Watson | 395/600 |
| 4,775,932 | 10/1988 | Oxley et al. | 395/600 |
| 4,775,934 | 10/1988 | Houri et al. | 395/575 |
| 4,807,120 | 2/1989 | Courts | 395/425 |
| 4,912,629 | 3/1990 | Shuler, Jr. | 395/600 |
| 5,241,673 | 8/1993 | Schelvis | 395/600 |
| 5,274,804 | 12/1993 | Jackson et al. | 395/600 |

*Primary Examiner*—Thomas G. Black
*Assistant Examiner*—Wayne Amsbury
*Attorney, Agent, or Firm*—David C. Goldman; Paul R. Webb, II

[57] ABSTRACT

The present invention solves both the dangling pointer problem and the garbage collection problem in software systems. Safe object pointers are divided into strong and weak pointers. Strong pointers point to an object unless they are explicitly assigned a new value, set to null, or destroyed. Weak pointers point to an object as long as the object has not been destroyed. If an object is destroyed, the weak pointer effectively becomes null, thus allowing the breaking up of cycles of references in a computer memory.

1 Claim, 1 Drawing Sheet

SYSTEM FOR AUTOMATIC GARBAGE COLLECTION USING STRONG AND WEAK ENCAPSULATED POINTERS

This invention relates to the field of computer programming in general and more specifically to the solution of the dangling pointer problem and the garbage collection problem.

BACKGROUND OF THE INVENTION

In software it is frequently necessary for one part of a program to make reference to a program element such as a data structure that was constructed by some other portion of the program. Such elements are commonly referred to as objects. The means commonly employed for referring to an object is to use a pointer to the object. A problem arises when the object being pointed to is destroyed and a subsequent attempt is made to use the pointer to access the object. This usually leads to a fatal program error. This is commonly referred to as the dangling pointer problem.

One approach to solving the dangling pointer problem is to count the number of references to an object. Since objects can not be safely destroyed until all references to them are removed, object destruction is postponed until the pointer count reaches zero. This presents a problem when circular references exist. In FIG. 1, objects A and B have pointers to each other and some other global pointer (somewhere else in the program) refers to object A. It can be assumed that the pointers shown are all of the existing pointers to A and B. If the global pointer is removed (either destroyed or made to point to another object), objects A and B remain inaccessible from the rest of the program. However they cannot be destroyed, since each has one remaining pointer to it. Objects A and B are garbage as far as the rest of the program is concerned. The problem of identifying them as garbage, and removing them is known as the garbage collection problem.

To deal with the garbage collection problem, previous pointer counting schemes have required the application programmer to explicitly identify situations such as just described, and to write code that explicitly removes some pointers, such as the pointer from B to A in FIG. 1. After the removal of these pointers, some objects (A in this example) will have no remaining pointers and can be destroyed. In the process of destruction, the pointers that these objects have to other objects are also destroyed (in this example, the pointer from A to B) leaving others objects (B) with no remaining pointers. The process continues until all isolated objects have been destroyed. The problem with this approach is not the writing of the code that dismantles the pointers but is determining when to call the code. The programmer must determine when each segment becomes isolated.

The garbage collection problem has a serious effect on the software development process. Despite continuing advances in language and software technology, the proper management of memory continues to constitute a large portion of the overall effort required to develop software systems. In the popular C language, the simplicity of malloc ( ) and free ( ) has great appeal. However, this simplicity does have its costs. It is simply too easy to prematurely free memory and then attempt to reference that memory with a dangling pointer, or to fail to free memory altogether, creating a memory leak. Unfortunately, it is usually very hard to locate and fix these types of errors once they have been made. They are usually the types of errors that can remain undetected despite testing, possibly leading to dangerous and expensive failures of software in the field.

From the programmer's point of view, the best remedy to these problems is automatic garbage collection. In languages that support automatic garbage collection, memory management becomes trivial: one simply allocates an object whenever needed, with no worry about deallocating it. Most automatic garbage collection schemes have depended upon exhaustive searches through an application's data space for any and all references to objects. However, another mechanism is needed because the processing requirements of such exhaustive searches makes this technique too inefficient for most current C and C++ applications.

SUMMARY OF THE INVENTION

According to the present invention a method is provided for performing automatic garbage collection in a software system. Cycles of pointers to objects are first identified and at least one of the pointers in the cycle is replaced with a weak encapsulated pointer. This weak pointer will point to an object until the object is destroyed. It will not prevent an object from being destroyed but will instead safely become a null pointer upon the destruction of an object to which it points. The use of weak encapsulated pointers to break cycles aids in the garbage collection process since the absence of cycles ensure that segments will be destroyed when they become isolated from the rest of the program. An object being pointed to by a weak pointer may be safely destroyed as long as the count of strong pointers to it has decremented to zero. Once destroyed, all of the pointers from the object to other objects also go away thus allowing for more objects to be destroyed until the "garbage" is effectively eliminated from the system.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
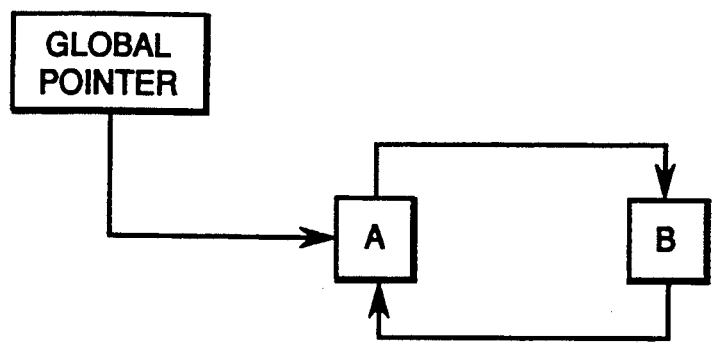
FIG. 1 is a schematic view of a simple data structure containing a cycle of pointers.
Figure 2:
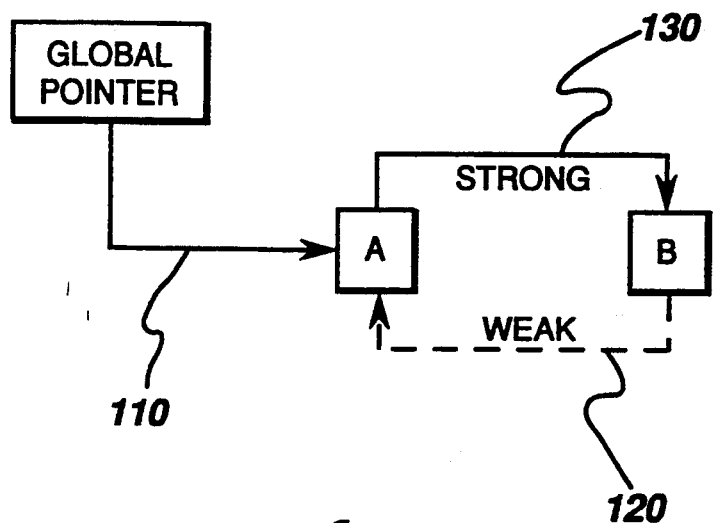
FIG. 2 is a schematic view of a simple data structure benefitting from the use of the strong and weak encapsulated pointers of the present invention.

FIG. 2 is a schematic view of a simple data structure benefitting from the use of the strong and weak encapsulated pointers of the present invention. Strong encapsulated pointers 110 and 130 and weak encapsulated pointer 120 are supported by maintaining separate reference counts on the objects. A's reference count of two consists of a strong count of one and a weak count of one. If pointer 130 is removed, A's strong reference count decrements to zero, which causes A to be destroyed despite its non-zero weak reference count. B's weak pointer referring to A safely becomes a null pointer. The destruction of A causes its strong encapsulated pointer 130 referring to B to be destroyed; this causes B's strong reference count to decrement to zero, which causes B to also be destroyed. The garbage has thus been eliminated from the memory of the computer.

The data structures for an application must be designed so that every cycle of references that exists contains at least one weak encapsulated pointer. Automatic garbage collection will not occur in applications whose data structures contain cycles of strong encapsulated pointers. In this case memory management must again be performed explicitly by the application, although the application still benefits from the use of safe encapsulated pointers.

To take advantage of the present invention, a programmer must first identify cycles of references. At least one weak pointer must be used within the cycle. When the objects in the cycle become isolated from the rest of the program, the cycle will automatically be destroyed through a normal counted pointer scheme as applied to the strong pointers only. The novel aspect of the present invention is the use of the weak pointer as described above.

The concept of an encapsulated or "smart" pointer is not new. Such a pointer behaves like a regular pointer but performs the additional function of updating a reference count on each access through them. When an encapsulated pointer is made to point to a particular object, it informs the object. The object in turn keeps track of the number of encapsulated pointers that refer to it. By examining the count of pointers on an object, it can be determined when the object may safely be destroyed without creating any dangling pointers. Prior art encapsulated pointers do not, however, handle the problem of cyclic references as described in the background section. The use of strong and weak encapsulated pointers does handle the problem.

Strong encapsulated pointers forever point to an object, unless they are explicitly assigned a new value, set to null, or destroyed. The existence of a strong encapsulated pointer to an object insures that the object is never destroyed; thus it is always safe to reference the object through that strong encapsulated pointer. Weak encapsulated pointers point to an object as long as the object has not been destroyed, and otherwise safely become null. Weak encapsulated pointers are volatile; objects can safely be referenced through a weak encapsulated pointer once an explicit check for the null value has been performed.

Appendix A includes source code which implements the present invention.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

Hackler, C. L., "Latest Porcelain Enamel Application Technology For Appliance Components," *Ceram. Eng. Sci. Proc.*, 1988, pp. 375–379.

object.h        Tue May 28 08:52:29 1991

Pat 6 No. 5,398,334
Ser 6 No. 863,924
Iss. Date: March 14, 1995 define DECLARE_MEMBERS(C) GtDECLARE_MEMBERS(C)

/*
GtObject        Object, with Reference Counts.

Base object class that provides for runtime type-checking, and additionally
provides object 'reference' counts and the methods used to maintain those
counts. These objects automatically destroy themselves when their STRONG
reference count decrements to 0. It is thus the intent that all objects be
allocated from heap storage, and exist as long as any (strong) reference
to the object exists. Under this scenario it is invalid to explicitly
destroy an object that has a nonzero strong reference count.

A user of 'GtObject' can insure proper use of a derived subclass simply
by always defining a destructor with protected access. This will cause
compilation errors if applications create static or auto instances of
the class, or attempt to delete an instance through a pointer.

Difficulties arise when objects contain references to other objects that
form a cycle. If all references outside the cycle are removed, then the
objects cannot be destroyed since the reference counts will never reach
zero. A fully general solution to this problem would be inordinately
expensive. The approach taken here is the implementation of two kinds
of references to objects, and correspondingly two reference counts on
'GtObject': 'Strong' and 'Weak'. Strong references to objects are safe,
since an object with a nonzero strong reference count cannot be
destroyed. Weak references to objects must always be qualified by a
check to see if the object has been destroyed before calling other methods
on the object. Destroying an object with a nonzero weak reference count calls
the object's destructor, but does not release the memory allocated for
the object; the memory is released later as weak references are removed
from the object and the weak reference count drops to zero.

Because it is an error to explicitly destroy an object with a nonzero
strong reference count, the user must maintain and be aware of those
counted references. As this is application-specific, the following
virtual method is provided:

void discard()                      object no longer useful

Applications may wish to define this method to remove application-global
references to the object being discarded, so that the strong reference
count on the object will drop to zero, allowing the object to be
destroyed. The default implementation of this method does nothing.

Two special virtual methods are also provided which are used on particular
insertions of objects into container classes:

GtBoolean isEqual(const GtObject*) const    generic equality
    GtCardinal hashKey() const                  generic hash table key The default implementation defines both equality and hashing in terms of
the pointer address to an instance of an object; specialized objects may
need to provide their own implementations.

For debugging purposes one may also wish to implement the following
virtual method:

void debugPrint(FILE*) const        debug printout to file

This method is called implicitly by the various container debug printout
functions, after the index, memory address, and object type have been
output for each entry in the container.
*/

© 1991 General Electric Co.

---

APPENDIX A

```
class GtObject : public GGET {
    GtDECLARE_MEMBERS(GtObject);
    friend GtRefPtr;
    friend GtRefWeakPtr;
    friend GtArrayCC;

public:
    const GtClassType* objectType() const;
    const char* typeName() const;
    const char* typeVersion() const;
    GtCardinal instanceCount() const;
    int downcastOffset() const;
    GtBoolean isA(const GtClassType* ot) const;
    GtBoolean isA(const char* ot) const;
    GtBoolean isOfType(const GtClassType* ot) const;
    GtBoolean isOfType(const char* ot) const;

int strongReferences() const;
    int weakReferences() const;
    int referenceCount() const;

GtBoolean isDead() const;
    GtBoolean inDestructor() const;
    GtBoolean isAlive() const;

virtual void discard();
    virtual GtBoolean isEqual(const GtObject* obj) const;
    virtual GtCardinal hashKey() const;
    virtual void debugPrint(FILE*) const;

static void* operator new(size_t s);
    static void operator delete(void* b);

protected:
    GtObject();
    virtual ~GtObject();
    GtCardinal addInstance();
    GtCardinal removeInstance();
    void disableAutoDestruct();
    void enableAutoDestruct();

private:
    GtObject(const GtObject&);
    GtObject operator=(const GtObject&);

void callDestructor();
    void strongRefObject();
    void strongUnrefObject();
    void removeStrongRef();
    void weakRefObject();
    void weakUnrefObject();
    void removeWeakRef();

void* aDeadObject;
``` object.h                Tue May 28 08:52:29 1991

```
    short aStrongReferences;
    short aWeakReferences;

static GtObject* saFreeObject;
};

inline GtBoolean GtObject::isDead() const {
    return aDeadObject != 0 && aDeadObject != (void*)1;
} inline GtBoolean GtObject::inDestructor() const {
    return aDeadObject == (void*)1;
} inline GtBoolean GtObject::isAlive() const {
    return aDeadObject == 0;
} inline void GtObject::strongRefObject() {
    aStrongReferences++;
#ifdef COMPILE_EXPENSIVE_DEBUG
    GtASSERT_DEBUG_PRINT
    printf("  '%s' @<0x%lx:%lx>   REF,    refCount: %d(%d:%d)\n",typeName(),
           this,aDeadObject,referenceCount(),strongReferences(),weakReferences());
#endif
} inline void GtObject::strongUnrefObject() {
    aStrongReferences--;
#ifdef COMPILE_EXPENSIVE_DEBUG
    GtASSERT_DEBUG_PRINT
    printf("  '%s' @<0x%lx:%lx>   UNREF,  refCount: %d(%d:%d)\n",typeName(),
           this,aDeadObject,referenceCount(),strongReferences(),weakReferences());
#endif
    if (aStrongReferences==0) callDestructor();
} inline void GtObject::removeStrongRef() {
    aStrongReferences--;
#ifdef COMPILE_EXPENSIVE_DEBUG
    GtASSERT_DEBUG_PRINT
    printf("  '%s' @<0x%lx:%lx>   REMOVE, refCount: %d(%d:%d)\n",typeName(),
           this,aDeadObject,referenceCount(),strongReferences(),weakReferences());
#endif
} inline void GtObject::weakRefObject() {
    aWeakReferences++;
#ifdef COMPILE_EXPENSIVE_DEBUG
    GtASSERT_DEBUG_PRINT
    printf("  '%s' @<0x%lx:%lx> WEAK REF,    refCount: %d(%d:%d)\n",typeName(),
           this,aDeadObject,referenceCount(),strongReferences(),weakReferences());
#endif
} inline void GtObject::weakUnrefObject() {
    aWeakReferences--;
#ifdef COMPILE_EXPENSIVE_DEBUG
    GtASSERT_DEBUG_PRINT
    printf("  '%s' @<0x%lx:%lx> WEAK UNREF,  refCount: %d(%d:%d)\n",typeName(),
           this,aDeadObject,referenceCount(),strongReferences(),weakReferences());
#endif
    if (aWeakReferences==0 && aStrongReferences==0) callDestructor();
} inline void GtObject::removeWeakRef() {
    aWeakReferences--;
#ifdef COMPILE_EXPENSIVE_DEBUG
    GtASSERT_DEBUG_PRINT
    printf("  '%s' @<0x%lx:%lx> WEAK REMOVE, refCount: %d(%d:%d)\n",typeName(),
           this,aDeadObject,referenceCount(),strongReferences(),weakReferences());
#endif
}

/*
 *^^^^^^^^^^^^^^^^^^^^^^^^^^^^^^^^^^^^^^^^^^^^^^^^^^^^^^^^^^^^^^^^^^^^^^^^^^^^^^
 *
 * Encapsulated Reference Pointers.
 *
 * Although the presence of reference counts alone on 'GtObject' does not
 * solve the problems of memory management, automation of the maintenance of
 * the reference counts will lend a great deal of support to that end. The
 * following classes encapsulates STRONG and WEAK reference pointers to class
 * 'GtObject' for the purpose of automatically maintaining reference counts
 * on the objects. If a specialized object class has class name 'X' then the
 * strong encapsulated reference pointer to that class has class name 'XPtr',
 * and the weak encapsulated reference pointer to that class has class name
 * 'XWeakPtr'.
 *
 * Encapsulated reference pointers act very much like ordinary pointers, in
 * that they are initializable and assignable to a pointer to an object, the
 * indirection operator '.' returns a reference to the object, and the
 * member access operator '->' is used to access members of the object. In
 * fact, encapsulated reference pointers are implicitly convertable into
 * ordinary pointers.
 *
 * Encapsulated reference pointers also act like a reference, in that they
 * are initializable to a reference to an object, and the address-of
 * operator '&' returns the address of the object. In addition, unlike
 * ordinary references, encapsulated reference pointers can be reassigned
 * to a reference to another object after initialization.
 *
 * Reference counting occurs as INSTANCES of encapsulated reference pointers
 * are initialized, assigned to point to new objects, and destroyed. Since
 * calls to destructors for instances of classes are generated automatically
 * by the compiler, the use of instances of encapsulated reference pointers
 * leads to automatic reference count maintenance, and therefore automatic
 * reference-counted garbage collection.
 *
 * The use of encapsulated reference pointers is very nearly identical to
 * the use of ordinary pointers, with the exceptions of the index operator
 * '[]' being unavailable and their not taking part in arithmetic operations
 * (deliberate). However, due to problems in the strong typing mechanisms
 * of C++, and faulty language design, there is one situation in which
 * the use of encapsulated reference pointers versus ordinary pointers
 * becomes an issue: initialization.
 *
 * If object 'B' is derived from object 'A', then the initialization of an
 * 'APtr' to a 'BPtr' will result in a compilation error in the following
 * situations:
 *
 *      extern void foo(APtr);
 *
 *      BPtr b = new B();
 *      APtr a = b;              // ERROR
 *      foo(b);                  // ERROR
 *
```

```
object.h                Tue May 28 08:52:29 1991

/*
 * Although a BPtr is implicitly convertable to a B*, which is also an A*
 * and thus acceptable as an initializer for an APtr, the compiler fails to
 * compile the two lines marked above ("The Annotated C++ Reference Manual",
 * page 27): "when no constructor for class X accepts the given type, no
 * attempt is made to find other constructors or conversion functions to
 * convert the assigned value into a type acceptable to a constructor for
 * class X".) The strange part is, the syntax 'APtr a(b);' DOES compile. In
 * the initialization cases above, one must simply make the invocation of
 * a constructor or the conversion of the derived subclass encapsulated
 * reference pointer to an ordinary pointer (or reference) explicit:
 *
 *      extern void foo(APtr);
 *
 *      BPtr b = new B();
 *      APtr a(b);              // OK
 *      APtr a = *b;            // OK
 *      foo(*b);                // OK
 *
 * [Note: the use of encapsulated pointers as formal arguments is not
 * advisable. By its very nature this constitutes a temporary reference to
 * an object, which could have the undesirable effect of causing an object
 * to be deleted 'out from under' the calling code. This is expecially
 * dangerous for function and method calls made in a constructor, since
 * there is as of yet no persistent strong reference to the object that is
 * under construction.]
 */

/*
 * [[ Internal Cast Functions: Not for General Use. ]]
 */ inline GtObject* (Gt_castPtrUp(void* ptr, int dncastOfs) {
    return (GtObject*)((ptr) ? ((char*)ptr)-dncastOfs) : 0); } inline void* (Gt_castPtrDn(const GtObject* ptr, int dncastOfs) {
    return (void*)((ptr) ? ((char*)ptr)+dncastOfs) : 0); }

/*
 * [[ Internal Macros: Not for General Use. ]]
 */ ifndef GTOBJECT_NOT_ROOT_BASECLASS
define GtDECL_CASTOFS(C)
#define GtCAST_UP(p,C)         ((GtObject*)((void*)(p)))
#define GtCAST_DN(p,C)         ((C*)((void*)(p)))
#else
#define GtDECL_CASTOFS(C)      extern const int name3(s,C,_DncastOfs);
#define GtCAST_UP(p,C)         (Gt_castPtrUp((void*)(p),name3(s,C,_DncastOfs))
#define GtCAST_DN(p,C)         ((C*)(Gt_castPtrDn(p,name3(s,C,_DncastOfs)))
endif define GtCAST_SO(v)           ((GtObject*)((unsigned long)(v)))
define GtCAST_OS(v,T)         ((T)((unsigned long)(v)))

/*
 *  ^^^^^^^^^^^^^^^^^^^^^^^^^^^^^^^^^^^^^^^^^^^^^^^^^^^^^^^^^^^^^^^^^^^^^^
 */
```

```
/*
 *  GtRefPtr                    Strong Encapsulated Reference Pointer.
 *
 *  The following class encapsulates a STRONG reference pointer to class
 *  'GtObject' for the purpose of automatically maintaining reference counts
 *  on the objects. If a specialized object class has class name 'X' then the
 *  strong encapsulated reference pointer to that class has class name 'XPtr'.
 *  Strong encapsulated reference pointers are 'safe' once initialized or
 *  assigned to point to an object, for the object cannot be destroyed as
 *  long as the strong reference exists.
 */ class GtRefPtr {
protected:
    GtRefPtr() { aObject = 0; }
    ~GtRefPtr() { mAssignPtr(0); }

GtRefPtr(const GtRefPtr& ptr) { mInitPtr(ptr.mGetPtr()); }
    GtRefPtr& operator=(const GtRefPtr& ptr)
        { mAssignPtr(ptr.mGetPtr()); return *this; }

GtObject* mGetPtr() const { return (this) ? aObject : 0; }
    void mInitPtr(GtObject* obj);
    void mAssignPtr(GtObject* obj);

private:
    GtObject* aObject;
};

/*
 *  Strong Encapsulated Reference Pointer Declaration Macro.
 *
 *  Macro used to declare a strong encapsulated reference pointer to a
 *  class ultimately singularly derived from 'GtObject'. If a class has
 *  name 'X' then the strong encapsulated reference pointer to that
 *  class has class name 'XPtr'.
 *
 *  In addition, a macro is provided to explicitly cast a strong pointer
 *  to a base class to a strong pointer to some subclass ultimately
 *  derived from that base class. As this is an explicit cast, it is up
 *  to the user to ensure that the base class instance being pointed to
 *  is actually part of an instance of the derived subclass.
 */

/*
 *  May be used BEFORE declaration of target object class.
 */ define GtDECLARE_PTR(X) \
    class X; GtDECL_CASTOFS(X)\
    class name2(X,Ptr) : public GtRefPtr {\
    public:\
        name2(X,Ptr)() {}\
        ~name2(X,Ptr)() {}\
        name2(X,Ptr)(const name2(X,Ptr)&ptr) {mInitPtr(ptr.mGetPtr());}\
        name2(X,Ptr)(X*obj) {mInitPtr(GtCAST_UP(obj,X));}\
        name2(X,Ptr)(X&obj) {mInitPtr(GtCAST_UP(&obj,X));}\
        name2(X,Ptr)& operator=(const name2(X,Ptr)&ptr)\
            {mAssignPtr(ptr.mGetPtr()); return *this;}\
        name2(X,Ptr)& operator=(X*obj)\
            {mAssignPtr(GtCAST_UP(obj,X)); return *this;}\
        name2(X,Ptr) operator->(X*obj)\
        name2(X,Ptr) operator=(X&obj)\
```

```
object.h          Tue May 28 08:52:29 1991

{mAssignPtr(GtCAST_UP((ob),X)); return *this;}\
    operator X*() const {return GtCAST_DN(mGetPtr()),X);}\
    X& operator*() const {return *GtCAST_DN(mGetPtr(),X);}\
    X* operator()() const {return GtCAST_DN(mGetPtr(),X);}\
    X* operator->() const {return GtCAST_DN(mGetPtr(),X);}\
    const name2(X,Ptr)* addrOf() const {return this;}\
    static X& obj)(const name2(X,Ptr)&p) {return *GtCAST_DN(p.mGetPtr(),X);}\
    static X* ptr(const name2(X,Ptr)&p) {return GtCAST_DN(p.mGetPtr(),X);}\
}

/*
 * Use to downcast a strong encapsulated reference pointer
 * to a derived subclass.
 */ define GtCASTPTR(ptr,X)  (*((name2(X,Ptr)*)ptr.addrOf()))

/* ^^^^^^^^^^^^^^^^^^^^^^^^^^^^^^^^^^^^^^^^^^^^^^^^^^^^^^^^^^^^^^^^^^^
 *
 * GtRefWeakPtr          Weak Encapsulated Reference Pointer.
 *
 * The following class encapsulates a WEAK reference pointer to class
 * 'GtObject' for the purpose of automatically maintaining reference counts
 * on the objects. If a specialized object class has class name 'X' then
 * the weak encapsulated reference pointer to that class has class name
 * 'XWeakPtr'. Weak encapsulated reference pointers are identical to their
 * strong pointer counterparts, except for their VOLATILE nature: a weak
 * encapsulated reference pointer can become null at any time without user
 * intervention. All dereferences of the pointer should be qualified by an
 * explicit check for the null value.
 */ class GtRefWeakPtr {
protected:
    GtRefWeakPtr() { aObject = 0; }
    ~GtRefWeakPtr() { mAssignPtr(0); }

GtRefWeakPtr(const GtRefWeakPtr& ptr) { mInitPtr(ptr.mGetPtr()); }
    GtRefWeakPtr& operator=(const GtRefWeakPtr& ptr)
        { mAssignPtr(ptr.mGetPtr()); return *this; }

GtObject* mGetPtr() const;
    void mInitPtr(GtObject* obj);
    void mAssignPtr(GtObject* obj);

private:
    GtObject* aObject;
};

/*
 * Weak Encapsulated Reference Pointer Declaration Macro.
 *
 * Macro used to declare a weak encapsulated reference pointer to a
 * class ultimately singularly derived from 'GtObject'. If a class has
 * name 'X' then the weak encapsulated reference pointer to that class
 * has class name 'XWeakPtr'.
 *
 * In addition, a macro is provided to explicitly cast a weak pointer
 * to a base class to a strong pointer to some subclass ultimately
 * derived from that base class. As this is an explicit cast, it is up
 * to the user to ensure that the base class instance being pointed to
 * is actually part of an instance of the derived subclass.
 */

/*
 * May be used BEFORE declaration of target object class.
 */ define GtDECLARE_WEAKPTR(X) \
    class X; GtDECL_CASTOFS(X)\
    class name2(X,WeakPtr) : public GtRefWeakPtr {\
    public:\
        name2(X,WeakPtr)() {}\
        ~name2(X,WeakPtr)() {}\
        name2(X,WeakPtr)(const name2(X,WeakPtr)&ptr) {mInitPtr(ptr.mGetPtr(),X);}\
        name2(X,WeakPtr)(X*ob) {mInitPtr(GtCAST_UP((ob),X));}\
        name2(X,WeakPtr)(X&ob) {mInitPtr(GtCAST_UP((ob),X));}\
        name2(X,WeakPtr)& operator=(const name2(X,WeakPtr)&ptr)\
            {mAssignPtr(ptr.mGetPtr()); return *this;}\
        name2(X,WeakPtr)& operator=(X*ob)\
            {mAssignPtr(GtCAST_UP((ob),X)); return *this;}\
        name2(X,WeakPtr)& operator=(X&ob)\
            {mAssignPtr(GtCAST_UP((ob),X)); return *this;}\
        operator X*() const {return GtCAST_DN(mGetPtr(),X);}\
        X& operator*() const {return *GtCAST_DN(mGetPtr(),X);}\
        X* operator()() const {return GtCAST_DN(mGetPtr(),X);}\
        X* operator->() const {return GtCAST_DN(mGetPtr(),X);}\
        const name2(X,WeakPtr)* addrOf() const {return this;}\
        static X& obj)(const name2(X,WeakPtr)&p) {return *GtCAST_DN(p.mGetPtr(),X);}\
        static X* ptr(const name2(X,WeakPtr)&p) {return GtCAST_DN(p.mGetPtr(),X);}\
    }

/*
 * Use to downcast a weak encapsulated reference pointer
 * to a derived subclass.
 */ define GtCASTWEAKPTR(ptr,X)  (*((name2(X,WeakPtr)*)ptr.addrOf()))

/* ^^^^^^^^^^^^^^^^^^^^^^^^^^^^^^^^^^^^^^^^^^^^^^^^^^^^^^^^^^^^^^^^^^^
 *
 * Containers.
 *
 * Containers are used to manage collections of encapsulated reference
 * pointers to objects derived from 'GtObject', and integral, SCALAR values.
 * Containers allocate memory dynamically, automatically increasing or
 * decreasing their allocation as required; allocated memory is always copied
 * whenever containers are initialized or assigned. All containers may be
 * indexed from 0 to N-1, where N is the number of entries in the container;
 * by convention a negative index indicates a nonexistent entry. Operations
 * perform range checks on supplied indices unless specified "unchecked".
 * The integer value returned by operations is the index position of the
 * entry just found, inserted, removed, or stored. Operations on containers
 * that involve searching for objects use the objects' virtual 'isEqual()'
 * method for comparison. Containers that use hashing for efficiently
 * searching over a large number of objects use the objects' virtual
 * 'hashKey()' method to compute an initial guess at the location of objects
```

```
object.cc         Wed Jun 12 11:47:49 1991

* actually require this ordering; only that in multiple inheritance no two
 * parent classes inherit from 'GtObject'.

*
 * 2. Reference Counted Objects.
 *
 * To quote from "Data Abstraction and Object-Oriented Programming in C++"
 * (NIHCL): "Mismanagement of memory allocated via the NEW operator is the
 * most frequent cause of serious programming errors when using C++ classes.
 * It is simply too easy to delete an object prematurely and then attempt to
 * reference the deallocated memory with a 'dangling' pointer, or to forget
 * to delete it altogether, creating a 'memory leak'. These types of errors
 * can be extremely difficult to track down."
 *
 * In particular, the sharing of objects within a software system yields
 * direct opportunity for the above stated difficulties to arise.
 *
 * Base class 'GtObject' has additional methods designed to help automate
 * the management of memory, in a way that directly supports the sharing of
 * objects. 'GtObject' reference counted objects operate by maintaining a
 * 'reference' count, automatically calling their own destructor when their
 * reference count drops to zero. Although the presence of the reference
 * count alone on 'GtObject' does not solve the above stated problems,
 * automation of the maintenance of the reference counts will lend a great
 * deal of support to that end. Automatic maintenance of reference counts
 * can be accomplished via encapsulated reference pointers to objects
 * derived from 'GtObject'.
 *
 * Implementations based on 'GtObject' with encapsulated reference
 * pointers MUST make the following assumptions in order to guarantee valid
 * operation of the resulting software:
 *
 *  - client programs use encapsulated reference pointers to define the
 *    'lifetime' of an object; i.e., encapsulated reference pointers are
 *    used in persistent data structures to refer to other objects, and
 *    as client-global handles to persistent data.
 *
 *  - ordinary C++ pointers, when used, are used for temporary references
 *    to objects (for instance, as the type of a formal argument that
 *    refers to an instance of an object).
 *
 *  - client programs do not refer to encapsulated pointers indirectly
 *    through an ordinary pointer, but rather only create INSTANCES of
 *    encapsulated pointers.
 *
 *  - client programs do not explicitly manipulate reference counts, but
 *    rather all reference count manipulation occurs through encapsulated
 *    pointers.
 *
 *  - client programs do not explicitly destroy ('GtObject based) counted
 *    objects, but rather let the encapsulated pointers automatically destroy themselves
 *    when references to them no longer exist. [In fact, it is an ERROR
 *    to attempt to explicitly destroy an object]
 *
 * In the case of a self-referring class or mutually-referring classes,
 * instantiation requires that all involved encapsulated reference pointer
 * classes be declared BEFORE the targeted classes.
 *
 * The additional methods on class 'GtObject' are as shown below. Class
 * 'GtRefPtr' encapsulates a reference pointer to 'GtObject', and class
 * 'GtArrayCC' is a generic array container of reference pointers to class
 * 'GtObject'.
 *
 class GtObject {
    GtDECLARE_MEMBERS(GtObject);
    friend class GtRefPtr;
    friend class GtArrayCC;
 private:
    void refObject() { aReferenceCount++; }
    void unrefObject()
        { if (--aReferenceCount == 0) delete this; }
    int aReferenceCount;
 };

*
 * 2a. 'GtRefPtr' Class.
 *
 * Class 'GtRefPtr' encapsulates a pointer to the 'GtObject' counted object
 * base class for the purpose of automatically maintaining reference counts.
 * This is done in the following way (similar to "counted pointers" devised
 * by Shapiro).
 *
 class GtRefPtr {
    friend class GtArrayCC;
 protected:
    GtRefPtr() { aObject=0; }
    ~GtRefPtr() { assignPtr(0); }
    GtRefPtr(const GtRefPtr& ptr) { initPtr(ptr.getPtr()); }
    GtRefPtr(GtObject* obj) { initPtr(obj); }
    GtObject* getPtr() const { return aObject; }
    void initPtr(GtObject* obj)
        { if (aObject=obj) aObject->refObject(); }
    void assignPtr(GtObject* obj)
        { if (aObject != obj)
             { if (aObject) aObject->unrefObject(); initPtr(obj); }
        }
 private:
    GtObject* aObject;
 };

*
 * There in fact must be a generic base class for all encapsulated
 * reference pointer classes, so as to grant friendship rights to the
 * private methods on 'GtObject' used to manage the reference count.
 *
 * 2b. Encapsulated Reference Pointer Class Derivation.
 *
 * Given the following derivation of subclass 'SuperObject':
 *
 class SuperObject : public GtObject, public Mix1, public Mix2 {
    GtDECLARE_MEMBERS(SuperObject);
 };

*
 * its encapsulated pointer class is derived as follows:
 *
 class SuperObjectPtr : public GtRefPtr {
 public:
    SuperObjectPtr() {}
    ~SuperObjectPtr() {}
    SuperObjectPtr(const SuperObjectPtr& ptr) { initPtr(ptr.getPtr()); }
    SuperObjectPtr(SuperObject* obj) { initPtr(obj); }
    SuperObjectPtr operator= (const SuperObjectPtr& ptr)
        { assignPtr(ptr.getPtr()); return *this; }
    SuperObjectPtr operator= (X* obj)
``` leads to difficulties in terms of logistics and maintenance, the approach
selected was a hybrid of the other two. Through a preprocessor symbol
code is conditionally compiled in to either (a) perform runtime casting,
giving the user total freedom in specifying base classes in multiple
inheritance, or (b) perform compile time casts, forcing the 'GtObject'
based parent class to be listed first. In the case of (b), additional
code is generated which verifies at execution initialization that all
object classes indeed have 'GtObject' at the root of the derivation; if
not, the name of each such class is displayed on standard error, and the
program is forced to abort.

2c. Mixing Ordinary Pointers and Encapsulated Reference Pointers.

Encapsulated reference pointers behave nearly identically to ordinary
C++ pointers. Encapsulated reference pointers can be initialized by or
assigned to a pointer to an object. And, due to the member access operator
and implicit conversion available to an ordinary pointer, they can be
used wherever an ordinary pointer is required:

```
GtDECLARE_PTR(A);
GtDECLARE_PTR(B);

class A : public GtObject { ... };
class B : public A { ... };

extern void foo(const A*);

APtr a;
BPtr b;

b = new B();             // initialize with pointer
b->method();             // access class member
a = b;                   // convert to B* (implicitly an A*)
foo(a);                  // convert to A*
```

Indeed one might not be able to tell the difference between an
encapsulated reference pointer and an ordinary pointer, were it not for
one large hole in the C++ language (one the author considers to be a
BUG). To quote from "The Annotated C++ Reference Manual" (page 271):

"When no constructor for class X accepts the given type, no attempt
is made to find other constructors or conversion functions to
convert the assigned value into a type acceptable to a constructor
for class X."

What this means is that, given the above example, the following will
not compile:

```
BPtr bp = new B();
APtr ap = bp;            // get compilation error
foo(bp);                 // get compilation error
```

The error reported for the above initializations is "cannot make a APtr
from a BPtr". This, despite the fact that there is an implicit conversion
available to an ordinary B*, and despite the fact that the following code
DOES compile:

```
BPtr bp = new B();
APtr ap = APtr(bp);      // OK!!
APtr ap(bp);             // OK!!
APtr ap = *bp;           // OK!!
foo((B*)bp);             // OK!!
```

--- object.cc       Wed Jun 12 11:47:49 1991

```
{ assignPtr(obj); return *this; }
operator SuperObject*() const { return (SuperObject*)getPtr(); }
SuperObject* operator*() const { return *((SuperObject*)getPtr()); }
SuperObject* operator->() const { return (SuperObject*)getPtr(); }
};
```

This assumes the use of the following naming conventions: if an object
class has name 'X' then the encapsulated reference pointer to that class
has class name 'XPtr'. The derivation of an encapsulated reference pointer
class, given the above design and the restriction of single inheritance
from 'GtObject', is in fact "boiler plate", and is thus a candidate for
automation through a preprocessor GtDECLARE_PTR macro:

GtDECLARE_PTR(SuperObject);

Note that generic base class 'GtRefPtr' does not have a GtObject'
conversion operator defined. If it did, it would be inherited by all
derived encapsulated reference pointer classes, which would lead to a
multitude of ambiguities. Because class derivation is used to define
encapsulated pointers to subclasses of 'GtObject', member 'aObject' of
class 'GtRefPtr' is declared to be of type 'GtObject*'. However, this
complicates the mechanics of defining the derived encapsulated reference
pointer and implementing the GtDECLARE_PTR preprocessor macro, due to the
following language issue (Annotated C++ Reference Manual, page 68):

"A yet undefined class may be used in a pointer cast, in which
case no assumptions will be made about class lattices."

The required cast of 'aObject' to a pointer to the derived object
subclass in the various operator methods above is not safe unless (a)
'GtObject' is at the root of the object class hierarchy, or (b) the
targeted object class is not undefined, i.e. its declaration has already
been seen by the compiler.

Restriction of 'GtObject' to the root of the class hierarchy requires
that clients list the 'GtObject' based parent class first in all cases of
multiple inheritance. Although this appears to be an easy convention to
follow, given the limited use of multiple inheritance and preprocessor
macros being employed, accidental non-compliance will result in code that
fails at runtime in obscure, esoteric ways. In addition, use of automatic
code generation tools for which no specific ordering of parent classes
is specifiable may make compliance to such a convention unattainable.

Performing no casts to undefined types while allowing self-referring or
mutually-referring classes requires that the GtDECLARE_PTR macro be split
into two macros: one to be used BEFORE the targeted class is declared, and
one to be used AFTER the declaration of the targeted class. For instance:

GtDECLARE_PTR(SuperObject);

class SuperObject : public GtObject, public Mix1, public Mix2 {
    GtDECLARE_MEMBERS(SuperObject);
    ...
};

GtDEFINE_PTR(SuperObject);

Another approach is to save class lattice information calculated after a
class has been fully declared, and perform casts with a runtime addition.
This removes the requirement that GtDECLARE_PTR be split into two macros
and simplifies the logistics of handling mutually-referring classes that
are defined in different modules, but at considerable runtime expense.

Given that the split macro approach suffers from a lack of elegance and object.cc          Wed Jun 12 11:47:49 1991

If encapsulated reference pointers could be derived in a way that parallels the derivation of the object classes that they refer to (that is, class BPtr was derived from APtr as object class B is derived from A), giving the compiler the same implicit knowledge it has about ordinary pointers to derived subclasses, then the above code would compile without error and encapsulated reference pointers would be for all intents and purposes indistinguishable from ordinary pointers. However, the use of such derivation has two drawbacks:

- the user is forced to define encapsulated reference pointer classes for ALL classes in a software package, even for internal classes that are not end-user visible, leading to a great deal of "baggage" and considerably longer compilation times, debuggable object module sizes, and load times. The same argument would apply to strongly-typed 'container classes', leading to a great deal more "baggage".

- It becomes impossible to define an implicit conversion operator to an ordinary pointer. As stated earlier, the inheritance of the conversion operator to a pointer to a subclass leads to ambiguities in almost every situation in which an encapsulated reference pointer is used.

Until the language is fixed, it will be necessary to put up with the inconvenience of not being able to directly initialize an encapsulated reference pointer to a/parent class to an encapsulated reference pointer to a derived subclass. In this one situation, use one of the alternate syntactic forms listed above.

3. Cyclic References: 'Strong' and 'Weak' Encapsulated Reference Pointers.

Homomorphic data structures consisting of objects with pointers that form a cycle pose a particularly nasty problem. For example, consider the following:

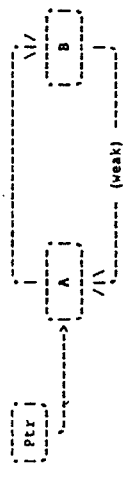

If 'Ptr' is removed, totally isolating objects A and B, then A and B will never be destroyed because their reference counts cannot reach zero. In general it will not be possible to detect that such a situation exists without an inordinate amount of overhead and bookkeeping.

An approach to handling the above is based on the implementation of two kinds of encapsulated reference pointers: strong and weak. Strong encapsulated reference pointers (the default type) are as described above; so long as at least one strong encapsulated reference pointer refers to an object then the object cannot be destroyed. Strong reference pointers are thus 'safe' once initialized as long as they are not explicitly set to null. Weak encapsulated reference pointers point to an object as long as the object has not been destroyed; otherwise they are null. Weak encapsulated reference pointers are therefore inherently VOLATILE, in that they can become null at any time without direct user intervention. It thus follows that all dereferences of a weak reference pointer should be qualified by an explicitly programmed check for the null value.

Note what happens when a weak encapsulated reference pointer is used for B's reference to A in the above diagram:

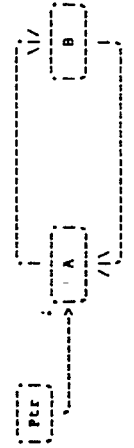

Now if 'Ptr' is removed, object A can be destroyed. This removes its strong reference pointer to B and effectively sets B's weak reference pointer to A to null. Removal of A's reference pointer to B allows object B to also be destroyed.

To support the concept of strong and weak encapsulated reference pointers, two separate reference counts are maintained on 'GtObject'; one for strong references and the other for weak references. Alternate methods are provided to manipulate each count independently, and are used by the corresponding encapsulated reference pointer class. An additional "dead object" entry is added which indicates if the object has been or is being destroyed:

```
class GtObject {
    GtDECLARE_MEMBERS(GtObject);
    friend class GtRefPtr;
    friend class GtRefWeakPtr;
public:
    GtObject() : aDeadObject(0), aStrongReferences(0),
                 aWeakReferences(0) {} virtual ~GtObject() { asFreeObject = this; } int referenceCount() const
      { return (int)aStrongReferences + (int)aWeakReferences; }
    int strongReferences() const { return (int)aStrongReferences; }
    int weakReferences() const { return (int)aWeakReferences; }
    GtBoolean isDead() const
      { return aDeadObject != 0 && aDeadObject != (void*)1; }
    GtBoolean inDestructor() const { return aDeadObject == (void*)1; }
    GtBoolean isAlive() const { return aDeadObject == 0; } void* operator new(size_t s) { return malloc(s); }
    void  operator delete(void*) {
        if (asFreeObject) {
            asFreeObject->aDeadObject = b; asFreeObject = 0;
        }
    }
private:
    void  strongRefObject() { aStrongReferences++; }
    void  strongUnrefObject()
        { if (--aStrongReferences==0) callDestructor(); }
    void  weakRefObject() { aWeakReferences++; }
    void  weakUnrefObject()
        { if (--aWeakReferences==0 && aStrongReferences==0)
            callDestructor();
        }
    void  callDestructor() {
        if (isAlive()) {
            aDeadObject = (void*)1;
            delete this;
        }
        if (aWeakReferences==0 && isDead()) free((char*)aDeadObject);
    }
    void*  aDeadObject;
    short  aStrongReferences;
    short  aWeakReferences;
```

```
Object.cc          Wed Jun 12 11:47:49 1991 static GtObject* ssFreeObject;
          ...
      };

*     If the strong reference count decrements to zero while weak references
*     to the object still exist, then the object is destroyed, but its memory
*     is not freed yet. Deallocation of the object's storage will be done later
*     when the weak reference count decrements to zero. Entry 'aDeadObject' is
*     thus used for two purposes: to indicate whether the object has been or
*     is being destroyed, and to save the address of the memory block that
*     needs to be deallocated.
*
*     Note that once an object's destructor has been called it is no longer
*     valid to invoke any virtual methods on the object, especially the
*     destructor itself. The implementation must thus insure that all uses of
*     a weak encapsulated pointer check entry 'aDeadObject' first, calling
*     'weakUnrefObject' and resetting the pointer address to null if the
*     object is not alive.

* 4.  'GtObject' Container Classes.

*     Most software dealing with objects will have a need for "container
*     classes", classes that hold or contain instances of objects, for the
*     construction and manipulation of complex data structures. A container
*     class for reference counted objects will need to maintain the reference
*     counts on the contained objects.

*     Use of a totally generic object container class is not type-safe; it
*     allows any subclass of object to be placed in the container while forcing
*     the client to explicitly downcast the generic object pointer to a derived
*     subclass. Also, in the case of reference counted objects, a totally generic
*     implementation of a container class may result in a large amount of
*     reference count maintenance being performed for no useful purpose
*     (potentially dangerous if the only reference to an object is in the
*     container).

*     To provide for efficient manipulation of reference counts while enabling
*     the derivation of type-safe containers of 'GtObject' subclasses, base
*     class 'GtArrayCC' is defined in terms of ordinary C++ pointers to class
*     to class 'GtObject', and is able to maintain reference counts through
*     friendship granted by 'GtObject'. 'GtArrayCC' is a dynamic contiguous
*     array indexed from 0 to N-1 where N is the number of entries:

class GtArrayCC {
      public:
          int count() { return aCount; }
      protected:
          GtArrayCC(int cap=0)
          {
              aCount = 0; aCapacity = (cap > 0) ? cap : 1;
              aArray = new GtObject*[aCapacity];
              for (int i=0; i < aCapacity; i++) aArray[i] = 0;
          }
          ~GtArrayCC()
          {
              for (int i=0; i < aCount; i++) assignEntry(aArray[i],0);
              delete (void*) aArray;
          }
          GtObject* mIndex(int idx)
          { return (idx >= 0 && idx < aCount) ? aArray[idx] : 0; }
*         int mStore(int idx, GtObject* ptr)
          { if (idx >= 0 && idx < aCount) mAssignPtr(aArray[idx],ptr);
            else idx = -1; return idx; }
      protected:
          static void mAssignEntry(GtObject*& ptr, GtObject* obj)
```

```
          { if (ptr != obj) {
              if (ptr) ptr->strongUnrefObject();
              if (ptr=obj) ptr->strongRefObject();
            }
          }
      protected:
          int aCount;
          int aCapacity;
          GtObject** aArray;
      };
```

*     Each subclass type-specific array container is derived directly from
*     'GtArrayCC'. For instance, given the derivation of class 'SuperObject'
*     in the prior above example, its array container is derived as follows:

```
      class SuperObjectArray : public GtArrayCC {
      public:
          SuperObjectArray (int cap=0) : GtArrayCC(len) { }
          SuperObject* index(int idx)
          { return (SuperObject*) mindex(idx); }
          int store(int idx, SuperObject* obj)
          { return mStore(idx,obj); }
      };
```

*     The derivation of container class 'SuperObjectArray' is in fact "boiler
*     plate", and is thus a candidate for automation through a preprocessor
*     GtDECLARE_ARRAY macro.

GtDECLARE_ARRAY(SuperObject);

*     The mechanics of defining and implementing the GtDECLARE_ARRAY
*     preprocessor macro are identical to the GtDECLARE_PTR macro. This adds
*     further credence to the hybrid casting approach selected above; otherwise
*     the declare array macro (and all others) would have to be split into two
*     macros (GtDECLARE_ARRAY, used before the targeted class declaration, and
*     GtDEFINE_ARRAY, used after the targeted class declaration).

*     In actuality two kinds of container classes will be provided: strong and
*     weak, corresponding to the two kinds of encapsulated reference pointers.

* 5.  'GtObject' and Encapsulated Reference Pointers:
*     Client Program Requirements for Class Derivation.

*     As with any software implementation technique not directly supported by
*     the language, employment of reference counted objects with encapsulated
*     reference pointers will mandate the use of a few programming conventions.
*     This is acceptable only if the conventions are few, localized, and
*     intuitive, and if it is not easy to make mistakes which slip through the
*     compiler that cause the software to break in obscure, esoteric ways.

*     Software using 'GtObject' and encapsulated reference pointers must
*     follow the following programming conventions in order to ensure valid
*     operation. These are conventions only, and, not being enforceable by the
*     compiler, are the sole responsibility of the user. However, strictly
*     following the conventions will make it extremely difficult for someone to
*     write code with programming errors that slip through the compiler
*     undetected.

*     a.  use provided preprocessor macros for object subclass and
*         encapsulated reference pointer class derivations; no such class
*         derivations are to be done 'by hand'. Name convention: if object
*         class has name 'X', 'strong' encapsulated reference pointer class
*         has name 'XPtr'; weak encapsulated reference pointer class has

```
object.cc        Wed Jun 12 11:47:49 1991
``` name 'XWeakPtr'.
     - Insures uniformity and correctness b. destructors of 'GtObject' subclasses protected.
     - client cannot create static or auto instances of object
       (heap storage only), or directly destroy it c. consider making constructors of 'GtObject' subclasses protected;
    provide public friend function that calls object constructor and
    returns encapsulated reference pointer to object. Or, if
    constructors made public, provide such constructor functions as
    a convenience. Name convention: if object class has name 'X',
    constructor function has name 'newX'.
     - Insures object is created properly from heap storage, and
       "held" on to by encapsulated reference pointer.

d. use INSTANCES of encapsulated reference pointers in persistent
    data structures and as handles to persistent data only. Use
    ordinary pointers for formal argument types and for other
    transient references to objects.
     - efficient, no temporaries need to be generated by compiler.

The following is a template describing the manner in which specialized
'GtObject' subclasses are derived, followed by some notes that describe
the conventions and assumptions being followed:

```
// In: client.h class Mix1 {
   GtDECLARE_MIXIN_MEMBERS(Mix1);
};
class Mix2 {
   GtDECLARE_MIXIN_MEMBERS(Mix2);
   ...
};

GtDECLARE_PTR(X);                                      // 2
GtDECLARE_WEAKPTR(X);                                  // 3
GtDECLARE_ARRAY(X);                                    // 4
GtDECLARE_WEAKARRAY(X);                                // 5 class X : public GtObject, public Mix1, public Mix2 {  // 6
   GtDECLARE_MEMBERS(X);                               // 7
public:
   X(<args>) { addInstance(); <<code>>; }              // 8
protected:
  ~X() { <<code>>; removeInstance(); }                 // 9
};
inline XPtr newX(<args>) { return XPtr(new X(<args>)); } // 10

// In: client.cc
#include <client.h>

GtDEFINE_MIXIN_CLASS_TYPE(Mix1);                       // 11
GtDEFINE_MIXIN_CLASS_TYPE(Mix2);

GtDEFINE_CLASS_TYPE_2(X,GtObject,Mix1,Mix2);           // 12
<< define methods >>
...
```

Notes.

1.  Defines members required for type checking presence of abstract mixin
    class in object subclasses.

2.  Declares (strong) encapsulated reference pointer for class 'X'.

3.  Identical declaration of weak encapsulated reference pointer for class
    'X'.

4.  Declares (strong) reference pointer array container class for class
    'X'.

5.  Identical declaration of weak reference pointer array for class 'X'.

6.  Declaration of subclass 'X'. List object-based parent class first,
    or code will have to be compiled with the GTOBJECT_NOT_ROOT_BASECLASS
    preprocessor symbol defined to compile-in runtime casts.

7.  Defines members required for object-oriented type checking.

8.  Public constructor. (Optional) By calling 'addInstance()' method, X
    class type descriptor will maintain total count of X object instances.

9.  Protected destructor: prevents user from creating static or auto
    instances of class or explicitly destroying instances of class.
    (Optional) By calling 'removeInstance()' method, X class type
    descriptor will maintain total count of X object instances.

10. Convenience constructor function that can be used to create instances
    of class X, returning encapsulated reference pointer to instance. As
    written here, a temporary XPtr object MAY be generated by some
    compilers (Sun C++ in most cases optimizes out construction of this
    temporary). In any case, unless the return value is assigned to an
    XPtr object the X instance will have a very short, useless lifetime.

11. Definitions of class type descriptors for abstract mixin classes;
    required to allow client to ask if object has mixin. The unnumbered
    version of the macro is used when there are no parent classes.

12. Definition of class type descriptor for class 'X', using macro
    tailored for classes derived from 'GtObject'. Although not strictly
    required, parent classes listed in same order as specified in class
    declaration (6), as client must MANUALLY insure consistency. The
    numbered version of the macro indicates the number of abstract mixin
    classes multiply-inherited.

6.  Efficiency.

If a C++ compiler performs inline substitution of inline methods, and
    'GtObject' is the root of all object subclass derivations, then the use of
    STRONG encapsulated reference pointers defined by this implementation to
    call object methods is no less efficient than using ordinary pointers; use
    of the strong encapsulated reference pointer in this context is totally a
    compile-time activity. Performing runtime casts adds an additional memory
    reference and conditional long integer addition per method call. If the
    constructors and destructors are also inline substituted the overhead object.cc        Wed Jun 12 11:47:49 1991

* incurred when strong encapsulated pointers are declared (initialized) and
* assigned new values is the optional runtime cast, and the maintenance of
* reference counts. Of course, something equivalent to reference counting
* must be performed anyway in order to allow for the sharing of objects.
* Since maintaining a reference count involves an integer addition followed
* by one or two integer comparisons and short jumps, the overall cost of
* the use of strong encapsulated reference pointers is fairly reasonable in
* comparison to the benefits provided.
*
* The use of WEAK encapsulated reference pointers has added both memory
* and execution overheads to the implementation: the "dead object" entry and
* an additional internal memory cycle and null check of the "dead object"
* entry on every use of a weak pointer. In addition, the user is duty bound
* to explicitly program a null pointer check before calling any methods
* through a weak encapsulated reference pointer. Despite these drawbacks,
* weak encapsulated reference pointers are regarded by the author as cost-
* effective in relation to their revolutionary benefit: safe, automatic
* management of memory for networks of objects with cyclic references. Note
* that weak encapsulated reference pointers will many times be used in
* places where an explicit check for null would be required by the appli-
* cation. Also note the added benefit of not having to write a complicated
* destructor method to "dismantle" an object; indeed, the user most often
* will not even have to write a destructor for his objects, as dismantling
* and memory management will happen automatically through the default
* destructor provided by the C++ compiler.
*
* Cyclic dependencies of strong encapsulated reference pointers must
* still be handled explicitly by the user.
*
* One may wish to take steps to minimize the generation of temporary
* encapsulated pointer values, especially inside of loops. The main way in
* which this is done is to program methods and functions using ordinary
* pointers as formal argument types. That is, encapsulated reference
* pointers are used for persistent data structures, while ordinary pointers
* are used for transient references to objects. In this case one must be
* careful that the method or function does not have side effects that might
* cause an object to be destroyed "out from under" the routine. If such a
* possibility exists, an auto instance of a strong encapsulated reference
* pointer could be used to safely hold onto the object. Or one could make
* the formal argument be an instance of or reference to an encapsulated
* reference pointers. However one must now be concerned about the temporary
* encapsulated reference pointer causing the object to be destroyed "out
* from under" the CALLING routine (something that can't ordinarily happen
* if the ordinary pointer to the object was obtained by conversion of a
* strong encapsulated reference pointer). Using encapsulated reference
* pointers as formal argument types also suffers from the C++ language
* BUG discussed previously; i.e. it will be necessary to explicitly
* dereference an encapsulated reference pointer to a derived subclass in
* situations such as:
*
*    GDECLARE_PTR(A);
*    GDECLARE_PTR(B);
*
*    class A : public GtObject { ... };
*    class B : public A { ... };
*
*    extern void foo(const APtr);
*
*    BPtr b = new B();
*
*    foo(b);         // bogus compilation error
*    foo(*b);        // OK!!

6a. Compiler Efficiency.

* Along with runtime efficiency, the efficiency of current C++ compilers,
* linkers, and debug tools may become an issue. If encapsulated reference
* pointers and strong-typed arrays, ordered sets, and sets are declared for
* every class in a software package, one is likely to see huge increases
* in the time it takes to compile modules, the size of the resultant object
* modules if compiled for debugging (-g option), the time it takes to link
* the final executable, and the size of the executable image file. The
* reason for this is simple: a 9:1 explosion in information due to 8
* additional support classes being declared for each object class.
*
* Although there are convenience methods for declaring ALL encapsulated
* reference pointer and container classes for a given object class, one
* should seriously consider only declaring those classes required by an
* application, to minimize the effect on compilation and debugging times.
* And, although strongly-typed containers are nice, one might also wish
* to consider using generic 'GtObject' containers instead of strongly-typed
* containers.

/*
 * GtClassType          Class 'Type' Descriptor.
 *
 * Class that is used to describe the 'type' of a class instance. Each class
 * in a derivation hierarchy will have a static instance of a type descriptor.
 */

/*
 * GtClassTypeList.
 */

GtClassTypeList::GtClassTypeList(const char* arg0, ...) {
    va_list ap;  register unsigned nargs = 0;

ignoreArg(arg0);
    va_start(ap,arg0);
    do nargs++; while (va_arg(ap,GtClassType*));
    va_end(ap);
    GtClassType** clp = aTypeList = new GtClassType*[nargs];
    va_start(ap,arg0);
    while (nargs--) *clp++ = va_arg(ap,GtClassType*);
    va_end(ap);
}

/*
 * GtClassType.
 */

GtBoolean GtClassType::saCastOffsetError = GtFALSE;

GtClassType::GtClassType(const char* name, const char* vers, GtCardinal size,
                         int castofs, GtBoolean runtimeCast,
                         const GtClassTypeList& btypes)

What is claimed is:

1. A method for automatic garbage collection in a software system comprising the steps of:

using strong pointers belonging to an application being run on said software system to reference objects therein, said objects maintaining a reference count of each strong pointer pointing thereto;

identifying cycles of strong pointers to objects in said software system;

replacing at least one of the strong pointers to said objects in said identified cycles with a volatile weak encapsulated pointer belonging to the application being run on said software system, said objects maintaining a separate reference count for each volatile weak pointer pointing thereto, said objects decreasing the strong pointer reference count as a volatile weak pointer is replaced for a strong pointer;

destroying any object as the strong pointer count reaches zero or as the volatile weak reference count reaches zero if and only if the strong pointer count is zero; and determining whether said objects in said identified cycles are safely referenced, said objects being safely referenced if the strong reference count is greater than zero.

* * * * *